(12) United States Patent
Ciocarlie et al.

(10) Patent No.: US 10,178,113 B2
(45) Date of Patent: Jan. 8, 2019

(54) SYSTEMS, METHODS, AND MEDIA FOR GENERATING SANITIZED DATA, SANITIZING ANOMALY DETECTION MODELS, AND/OR GENERATING SANITIZED ANOMALY DETECTION MODELS

(71) Applicants: Gabriela F. Ciocarlie, New York, NY (US); Angelos Stavrou, Springfield, VA (US); Salvatore J. Stolfo, Ridgewood, NJ (US); Angelos D. Keromytis, New York, NY (US)

(72) Inventors: Gabriela F. Ciocarlie, New York, NY (US); Angelos Stavrou, Springfield, VA (US); Salvatore J. Stolfo, Ridgewood, NJ (US); Angelos D. Keromytis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 643 days.

(21) Appl. No.: 14/798,006

(22) Filed: Jul. 13, 2015

(65) Prior Publication Data

US 2015/0326597 A1 Nov. 12, 2015

Related U.S. Application Data

(60) Continuation of application No. 13/778,064, filed on Feb. 26, 2013, now Pat. No. 9,088,596, which is a
(Continued)

(51) Int. Cl.
*H04L 29/06* (2006.01)
*G06N 99/00* (2010.01)

(52) U.S. Cl.
CPC ....... *H04L 63/1425* (2013.01); *G06N 99/005* (2013.01); *H04L 63/14* (2013.01)

(58) Field of Classification Search
None
See application file for complete search history.

(56) References Cited

U.S. PATENT DOCUMENTS 5,842,002 A 11/1998 Schnurer et al.
6,513,025 B1 1/2003 Rosen
(Continued)

FOREIGN PATENT DOCUMENTS

WO WO2005047862 5/2005
WO WO2007100915 9/2007
(Continued)

OTHER PUBLICATIONS

Shon, Taeshik et al.; "A hybrid machine learning approach to network anomaly detection"; Elsevier; Information Sciences 177 (2007) 3799-3821. (Year: 2007).*
(Continued)

*Primary Examiner* — Stanley K. Hill
(74) *Attorney, Agent, or Firm* — Byrne Poh LLP (57) ABSTRACT

Systems, methods, and media for generating sanitized data, sanitizing anomaly detection models, and generating anomaly detection models are provided. In some embodiments, methods for sanitizing anomaly detection models are provided. The methods including: receiving at least one abnormal anomaly detection model from at least one remote location; comparing at least one of the at least one abnormal anomaly detection model to a local normal detection model to produce a common set of features common to both the at least one abnormal anomaly detection model and the local normal detection model; and generating a sanitized normal
(Continued)

anomaly detection model by removing the common set of features from the local normal detection model.

18 Claims, 6 Drawing Sheets

Related U.S. Application Data division of application No. 11/940,790, filed on Nov. 15, 2007, now Pat. No. 8,407,160.

(60) Provisional application No. 60/987,135, filed on Nov. 12, 2007, provisional application No. 60/859,040, filed on Nov. 15, 2006.

(56) References Cited

U.S. PATENT DOCUMENTS

| | | | |
|---|---|---|---|
| 6,876,966 B1* | 4/2005 | Deng | G06K 9/6256 704/233 |
| 6,882,990 B1* | 4/2005 | Barnhill | G06K 9/6228 706/16 |
| 6,898,469 B2 | 5/2005 | Bickford | |
| 7,519,563 B1 | 4/2009 | Urmanov et al. | |
| 7,832,012 B2 | 11/2010 | Huddleston | |
| 7,836,356 B2 | 11/2010 | Haas et al. | |
| 7,904,959 B2 | 3/2011 | Sidiroglou et al. | |
| 2003/0065926 A1* | 4/2003 | Schultz | G06F 21/562 713/188 |
| 2003/0167402 A1* | 9/2003 | Stolfo | H04L 51/12 726/23 |
| 2006/0047617 A1 | 3/2006 | Bacioiu et al. | |
| 2006/0098818 A1 | 5/2006 | Fifer et al. | |
| 2007/0063548 A1* | 3/2007 | Eipper | G06K 9/6284 296/203.01 |
| 2008/0177680 A1 | 7/2008 | Laxman et al. | |
| 2008/0201278 A1 | 8/2008 | Muller et al. | |
| 2009/0030864 A1 | 1/2009 | Pednault et al. | |

FOREIGN PATENT DOCUMENTS

| | | |
|---|---|---|
| WO | WO2008036665 | 3/2008 |
| WO | WO2008055156 | 5/2008 |
| WO | WO2007100916 | 9/2009 |

OTHER PUBLICATIONS

Chandrashekar, Girish; "Fault Analysis using State-of-the-art Classifiers"; 2013; UMI Dissertation Publishing; 19 pages. (Year: 2013).*

Tax, David M.J. et al.; "Support Vector Data Description"; Kluwar Academic Publishers; Machine Learning, 54, 45-66, 2004. (Year: 2004).*

Anagnostakis, K.G., et al., "Detecting Targeted Attacks Using Shadow Honeypots", In Proceedings of the 14th USENIX Security Symposium (SSYM '05), Baltimore, MD, US, Jul. 31-Aug. 5, 2005, pp. 129-144.

Breiman, L., "Bagging Predictors", In Machine Learning, vol. 24, No. 2, Aug. 1, 1996, pp. 123-140.

Breunig, M.M., et al., "LOF: Identifying Density-Based Local Outliers", In Proceedings of the 2000 ACM SIGMOD International Conference on Management of Data (SIGMOD '00), Dallas, TX, US, May 16-18, 2000, pp. 93-104.

Chan, P.K. and Stolfo, S.J., "Experiments in Multistrategy Learning by Meta-Learning", In Proceedings of the Second International Conference on Information and Knowledge Management (CIKM '93), Washington, D.C., US, Nov. 1-5, 1993, pp. 314-323.

Crandall, J.R., et al., "On Deriving Unknown Vulnerabilities from Zero-Day Polymorphic and Metamorphic Worm Exploits", In Proceedings of the 12th ACM Conference on Computer and Communication Security (CCS '05), Alexandria, VA, US, Nov. 7-11, 2005, pp. 235-248.

Cretu, G.F., et al., "Data Sanitization: Improving the Forensic Utility of Anomaly Detection Systems", In Proceedings of the 3rd Workshop on on Hot Topics in System Dependability (HotDep'07), Edinburgh, UK, Jun. 26, 2007, pp. 1-6.

Detristan, T., et al., "Polymorphic Shellcode Engine Using Spectrum Analysis", In Phrack, vol. 61, Aug. 13, 2003, pp. 1-25, available at: http://www.phrack.org/issues.html?issue=61&id=9.

Dietterich, T.G., "Ensemble Methods in Machine Learning", In Proceedings of the First International Workshop on Multiple Classifier Systems (MCS '00), Cagliari, IT, Jun. 21-23, 2000, pp. 1-15.

Eskin, E., et al., "A Geometric Framework for Unsupervised Anomaly Detection: Detecting Intrusions in Unlabeled Data", In Applications of Data Mining in Computer Security, Springer, May 31, 2002, pp. 77-97.

Fogla, P. and Lee, W., "Evading Network Anomaly Detection Systems: Formal Reasoning and Practical Techniques", In Proceedings of the 13th ACM Conference on Computer and Communications Security (CCS '06), Alexandria, VA, US, Oct. 30-Nov. 3, 2006, pp. 59-68.

Forrest, S., et al., "Building Diverse Computer Systems", In Proceedings of the 6th Workshop on Hot Topics in Operating Systems (HotOS '97), Cape Cod, MA, US, May 5-6, 1997, pp. 67-72.

Freund, Y. and Schapire, R.E., "A Decision-Theoretic Generalization of On-Line Learning and an Application to Boosting", In Journal of Computer and System Sciences, vol. 55, No. 1, Aug. 1997, pp. 119-139.

Gates, C. and Taylor, C., "Challenging the Anomaly Detection Paradigm: A Provocative Discussion", In Proceedings of the 2006 Workshop on New Security Paradigms (NSPW '06), Schloss Dagstuhl, DE, Sep. 19-22, 2006, pp. 21-29.

Knorr, E.M. and Ng, R.T., "Algorithms for Mining Distance-Based Outliers in Large Datasets", In Proceedings of the 24th International Conference on Very Large Data Bases (VLDB '98), New York City, NY, US, Aug. 24-27, 1998, pp. 392-403.

Knorr, E.M. and Ng, R.T., "Finding Intensional Knowledge of Distance-Based Outliers", In Proceedings of 25th International Conference on Very Large Data Bases (VLDB '99), Edinburgh, UK, Sep. 7-10, 1999, pp. 211-222.

Krugel, C., et al., "Service Specific Anomaly Detection for Network Intrusion Detection", In Proceedings of the 2002 ACM Symposium on Applied Computing (SAC '02), Madrid, ES, Mar. 10-14, 2002, pp. 201-208.

Lippmann, R., et al., "Analysis and Results of the 1999 DARPA Off-Line Intrusion Detection Evalutation", In Proceedings of the International Symposium on Recent Advances in Intrusion Detection (RAID '00), Toulouse, FR, Oct. 2-4, 2000, pp. 162-182.

McHugh, J., "Testing Intrusion Detection Systems: A Critique of the 1998 and 1999 DARPA Intrusion Detection System Evaluations as Performed by Lincoln Laboratory", In ACM Transactions on Information and System Security (TISSEC), vol. 3, No. 4, Nov. 2000 pp. 262-294.

Moore, D. and Shannon, C., "The Spread of the Code-Red Worm (CRv2)", Caida.org, Sep. 24, 2007, pp. 1-7, available at: http://www.caida.org/analysis/security/code-red/coderedv2_analysis.xml.

Newsome, J., et al., "Polygraph: Automatically Generating Signatures for Polymorphic Worms", In Proceedings of the IEEE Symposium on Security and Privacy (S&P '05), Oakland, CA, US, May 8-11, 2005, pp. 226-241.

Office Action dated Mar. 30, 2011 in U.S. Appl. No. 11/940,790.
Office Action dated Apr. 15, 2014 in U.S. Appl. No. 13/778,064.
Office Action dated May 4, 2012 in U.S. Appl. No. 11/940,790.
Office Action dated Aug. 30, 2010 in U.S. Appl. No. 11/940,790.
Office Action dated Aug. 30, 2013 in U.S. Appl. No. 13/778,064.
Office Action dated Nov. 4, 2011 in U.S. Appl. No. 11/940,790.

Parekh, J.J., "Privacy-Preserving Distributed Event Coroooboration", Ph.D Dissertation, Columbia University, (month unknown) 2007, pp. 1-279.

Parmanto, B., et al., "Improving Committee Diagnosis with Resampling Techniques", In Advances in Neural Information Processing Systems, vol. 8, (month unknown) 1996, pp. 882-888.

Patil, H. and Fischer, C., "Efficient Run-Time Monitoring Using Shadow Processing", In Proceedings of the 2nd International Work- (56) References Cited

OTHER PUBLICATIONS shop on Automated and Algorithmic Debugging (AADEBUG '95), Saint-Malo, FR, May 22-24, 1995, pp. 1-14.
Ramadas, M., et al., "Detecting Anomalous Network Traffic with Self-Organizing Maps", In Proceedings of the 6th International Symposium Recent Advances in Intrusion Detection, (RAID '03), Pittsburgh, PA, US, Sep. 8-10, 2003, pp. 36-54.
Robertson, W., et al., "Using Generalization and Characterization Techniques in the Anomaly-Based Detection of Web Attacks", In Proceedings of the 13th Annual Network and Distributed System Security Symposium (NDSS '06), San Diego, CA, US, Feb. 2-3, 2006, pp. 1-15.
Sidiroglou, S., et al., "Building a Reactive Immune System for Software Services", In Proceedings of the 2005 USENIX Annual Technical Conference (USENIX '05), Anaheim, CA, US, Apr. 10-15, 2005, pp. 149-161.
Somayaji, A. and Forrest, S., "Automated Response Using System-Call Delays", In Proceedings of the 9th Conference on USENIX Security Symposium (SSYM '00), Denver, CO, US, Aug. 14-17, 2000, pp. 1-13.
Song, Y., et al., "On the Infeasibility of Modeling Polymorphic Shellcode", In Proceedings of the 14th ACM Conference on Computer and Communications Security (CCS '07), Alexandria, VA, US, Oct. 29-Nov. 2, 2007, pp. 541-551.
Stolfo, S.J., et al., "Cost-Based Modeling for Fraud and Intrusion Detection: Results from the JAM Project", In Proceedings of the DARPA Information Survivability Conference & Exposition (DISCEX '00), Hilton Head, SC, USA, Jan. 25-27, 2000, pp. 130-144.
Tan, K.M.C. and Maxion, R.A., "'Why 6?' Defining the Operational Limits of Stide, and Anomaly-Based Intrusion Detector", In Proceedings of the IEEE Symposium on Security and Privacy (S&P '02), Berkeley, CA, USA, May 12-15, 2002, pp. 188-201.
Wagner, D. and Soto, P., "Mimicry Attacks on Host-Based Intrusion Detection Systems", In Proceedings of the Ninth ACM Conference on Computer and Communications Security (CCS '02), Washington, D.C., US, Nov. 18-22, 2002, pp. 255-264.
Wang, K. and Stolfo, S.J., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.
Wang, K. et al., "Anomalous Payload-Based Worm Detection and Signature Generation", In Proceedings of the 8th International Symposium on Recent Advances in Intrusion Detection (RAID '05), Seattle, WA, US, Sep. 7-9, 2005, pp. 227-246.
Wang, K., et al., "Anagram: A Content Anomaly Detector Resistant to Mimicry Attack", In Proceedings of the International Conference on Recent Advanced in Intrusion Detection (RAID '06), Hamburg, DE, Sep. 20-22, 2006, pp. 226-248.
Wolpert, D.H., "Stacked Generalization", In Neural Network, vol. 5, No. 2, (month unknown) 1992, pp. 241-259.
Notice of Allowance dated Nov. 24, 2014 in U.S. Appl. No. 13/778,064.
Notice of Allowance dated Nov. 26, 2012 in U.S. Appl. No. 11/940,790.

\* cited by examiner

SYSTEMS, METHODS, AND MEDIA FOR GENERATING SANITIZED DATA, SANITIZING ANOMALY DETECTION MODELS, AND/OR GENERATING SANITIZED ANOMALY DETECTION MODELS

CROSS-REFERENCE TO RELATED APPLICATION

This application is a continuation of U.S. patent application Ser. No. 13/778,064, filed Feb. 26, 2013, which is a divisional of U.S. patent application Ser. No. 11/940,790, filed Nov. 15, 2007, which claims the benefit of U.S. Provisional Patent Application No. 60/859,040, filed Nov. 15, 2006, and U.S. Provisional Patent Application No. 60/987,135, filed Nov. 12, 2007, each of which is hereby incorporated by reference herein in its entirety.

STATEMENT REGARDING FEDERALLY SPONSORED RESEARCH OR DEVELOPMENT

This invention was made with government support under Grant No. DAFAFRLFA8750060221 awarded by the Disruptive Technology Office. The government has certain rights in the invention.

TECHNICAL FIELD

The disclosed subject matter relates to systems, methods, and media for generating sanitized data, sanitizing anomaly detection models, and generating anomaly detection models.

Models of data can be used to show characteristics of that data. For example, network data traffic models can be used to show unique characteristics of specific network data traffic. Network data traffic models can be used for detecting network data traffic content anomalies, such as malicious code. This is because the characteristics of normal data traffic differ from the characteristics of data traffic harboring malicious code, such as viruses, worms, Trojan horses, spyware, and/or other data that can cause harmful effects. Anomaly-based systems can be used to generate anomaly detection models and/or use anomaly detection models to monitor and detect anomalous code in, for example, network traffic, instruction streams, and/or streams of function calls, etc.

Anomaly-based systems can be used to detect abnormal inputs and/or behavior without relying on, for example, a static set of signatures or a potentially incomplete behavioral specification. The efficacy of anomaly detection sensors can depend, however, on the quality of the data used to train them. Artificial or contrived training datasets may not provide a realistic view of the deployment environment. On the other hand, real world datasets may be dirty, for example, they may contain a number of attacks or abnormal events. However, the size of training data sets can make manual removal or labeling of anomalies difficult and/or impractical. As a result, sensors trained on such data may, for example, miss some attacks and their variations.

SUMMARY

Systems, methods, and media for generating sanitized data, sanitizing anomaly detection models, and generating anomaly detection models are provided. In some embodiments, methods for generating sanitized data are provided. The methods including: dividing a first training dataset comprised of a plurality of training data items into a plurality of data subsets each including at least one training data item of the plurality of training data items of the first training dataset; based on the plurality of data subsets, generating a plurality of distinct anomaly detection micro-models; testing at least one data item of the plurality of data items of a second training dataset of training data items against each of the plurality of micro-models to produce a score for the at least one tested data item; and generating at least one output dataset based on the score for the at least one tested data item. In some embodiments, the methods include removing at least one data item of the plurality of data items from the input training dataset and generating a sanitized anomaly detection model based on the at least one output dataset. In some embodiments, the methods include testing an input dataset using the sanitized anomaly detection model to determine if the input dataset includes anomalies.

In some embodiments, computer-readable media containing computer-executable instructions that, when executed by a processor, cause the processor to perform methods for generating sanitized data are provided. The methods including: dividing a first training dataset comprised of a plurality of training data items into a plurality of data subsets each including at least one training data item of the plurality of training data items of the first training dataset; based on the plurality of data subsets, generating a plurality of distinct anomaly detection micro-models; testing at least one data item of the plurality of data items of a second training dataset of training data items against each of the plurality of micro-models to produce a score for the at least one tested data item; and generating at least one output dataset based on the score for the at least one tested data item.

In some embodiments, systems for generating sanitized data including an interface in communication with a network; a memory; and a processor in communication with the memory and the interface are provided, wherein the processor: divides a first training dataset comprised of a plurality of training data items into a plurality of data subsets each including at least one training data item of the plurality of training data items of the first training dataset; based on the plurality of data subsets, generates a plurality of distinct anomaly detection micro-models; tests at least one data item of the plurality of data items of a second training dataset of training data items against each of the plurality of micro-models to produce a score for the at least one tested data item; and generates at least one output dataset based on the score for the at least one tested data item.

In some embodiments methods for sanitizing anomaly detection models are provided. The methods including receiving at least one abnormal anomaly detection model from at least one remote location; comparing at least one of the at least one abnormal anomaly detection model to a local normal detection model to produce a common set of features common to both the at least one abnormal anomaly detection model and the local normal detection model; and generating a sanitized normal anomaly detection model by removing the common set of features from the local normal detection model.

In some embodiments, computer-readable media containing computer-executable instructions that, when executed by a processor, cause the processor to perform methods for for sanitizing anomaly detection models are provided. The methods including receiving at least one abnormal anomaly detection model from at least one remote location; comparing at least one of the at least one abnormal anomaly detection model to a local normal detection model to produce a common set of features common to both the at least one abnormal anomaly detection model and the local normal detection model; and generating a sanitized normal anomaly detection model by removing the common set of features from the local normal detection model.

In some embodiments, methods for sanitizing anomaly detection models are provided. The methods including: receiving at least one abnormal anomaly detection model from at least one remote location; testing at least one data item of a training dataset of data items against at least one of the at least one abnormal anomaly detection model to provide an indication that the at least one data item is abnormal; and creating a sanitized training dataset of data items based on the indication that the at least one data item is abnormal.

In some embodiments, computer-readable media containing computer-executable instructions that, when executed by a processor, cause the processor to perform methods for sanitizing anomaly detection models are provided. The methods including: receiving at least one abnormal anomaly detection model from at least one remote location; testing at least one data item of a training dataset of data items against at least one of the at least one abnormal anomaly detection model to provide an indication that the at least one data item is abnormal; and creating a sanitized training dataset of data items based on the indication that the at least one data item is abnormal.

DETAILED DESCRIPTION

Figure 1:
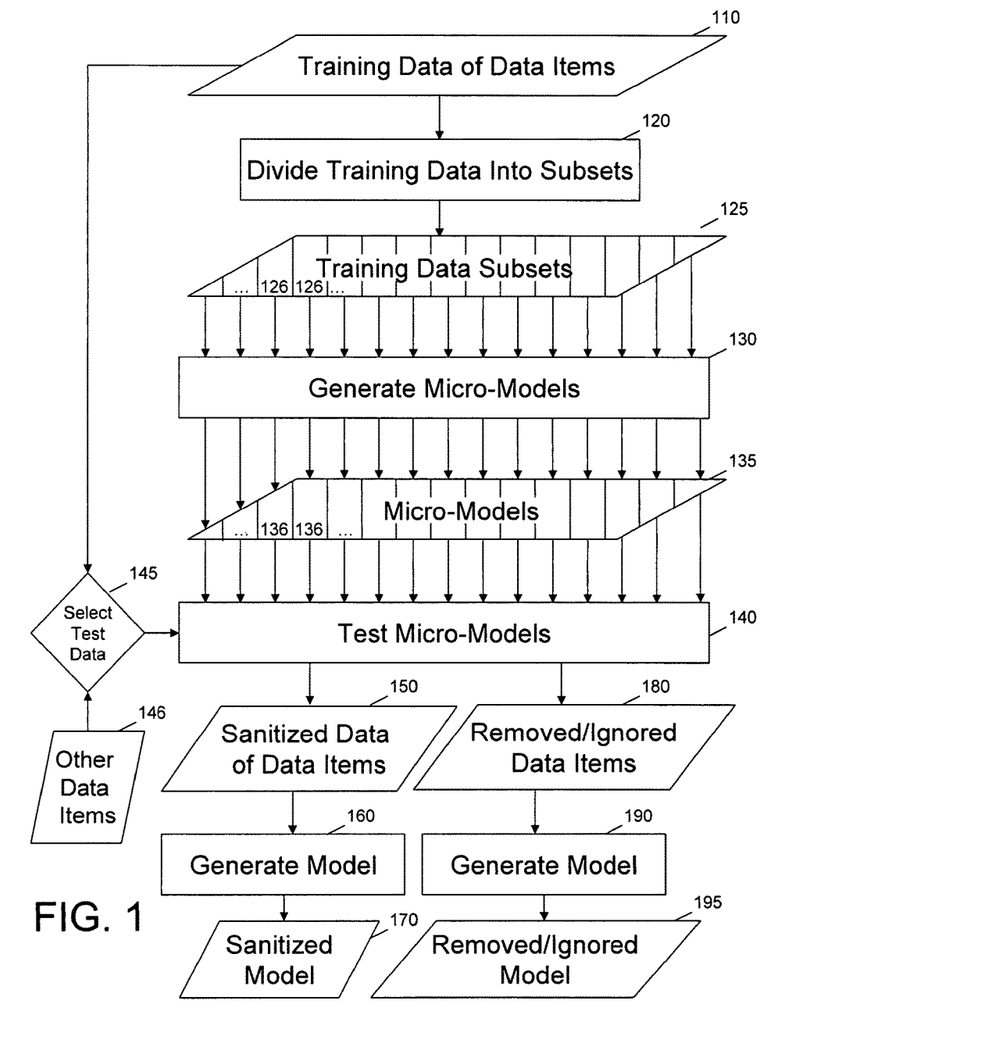
FIG. 1 is simple illustration of a method for generating at least one of a sanitized anomaly detection model and an abnormal anomaly detection model in accordance with some embodiments of the disclosed subject matter.

In some embodiments, systems, methods, and media for generating sanitized data, sanitizing anomaly detection models, and generating anomaly detection models are provided. For example, FIG. 1 illustrates a method for generating a model 170 from a set of training data 110. Training data 110 can be divided, at 120, into subsets 125. Subsets 125 can be used to generate, at 130, micro-models 135. In some embodiments, each training data subset 126 of training data subsets 125 can be used to generate a corresponding micro-model 136 of micro-models 135. Micro-models 135 can be sanitized, at 140, to generate sanitized data 150, by, for example, removing and/or ignoring information related to abnormal data-items that may be present in the training data 110 and training data subsets 125. Sanitizing, at 140, can include, testing the data items of training data 110 and/or other data items 146 against the micro-models 135. Which test-data to use in sanitizing, at 150, can be determined, at 145, and can be based on, for example, whether training data 110 and/or training data subsets 125 are available for sanitizing, at 140. Sanitized data 150 can be used to generate, at 160, a sanitized model, 170. In some embodiments, the data items that were removed and/or ignored, at 140, can be used to generate a data set of removed data items 180. Data set 180 can be used to generate, at 190, a model 195. In some embodiments, model 170 and/or model 195 can be used to detect anomalies. In some embodiments, model 170 can be a model of normal sanitized data and model 195 can be a model of abnormal data.

Training data 110 can include a plurality of training data items, such as, for example, packets, instruction streams, streams of function calls, portions of applications, embedded objects, etc. Training data 110 can also include, for example, a static file of previously collected data and/or a stream of data currently being monitored, at, for example, a network interface, and possibly being saved for future testing and/or analysis. In some embodiments, a training data 110 (T) can be divided into a number of smaller subsets $ss_1$-$ss_n$. This can be represented as $T=\{ss_1, ss_2, \ldots, ss_n\}$ where $ss_i$ is the subset starting at time $(i-1)*g$, where g is the granularity for each subset. The granularity of T can be defined in terms of, for example, a number of bytes, a number of instructions, a number of function calls, and/or a time period. Various values can be used for T. For example, in some embodiments, each subset 125 can be defined in terms of time with a granularity ranging from 3 to 5 hours and training data 110 can include data items monitored over 500 hours. Anomaly detection micro-models 135 (M), can be generated from a training dataset 110 T, which can be represented as M=AD (T), where AD can include various anomaly detection systems and/or methods. In some embodiments, training data subsets 125 can include all of training data 110 and in other embodiments, subsets 125 can include only a portion of training data 110 (e.g. selected randomly, selected manually, and/or selected based on data type).

Micro-models 135 can be sanitized, at 140, using the training data 110 and/or a second set of training data 146 (e.g., a stream of packets being observed on a network interface after training, at 125, is complete). Sanitizing, at 150, can generate a labeled data set with each training dataset item labeled as, for example, normal or abnormal. For example, labels, $L_{j,i}$ can be assigned based on a test of a training data item j against a micro-model $M_i$, i.e., $L_{j,i}=TEST(P_j,M_i)$, where the label $L_{j,i}$ is assigned a value of 0 if the model $M_i$ deems the data item normal or 1 of the model $M_i$ deems it abnormal.

The labels can be generalized by, for example processing a labeled dataset through a voting scheme, which assigns a score to each data item. The scores can represent, for example, various weight that data items are given in considering their contribution toward indicating normal or abnormal behavior. Such a score can be calculated as, for example:

$$\text{SCORE}(P_j) = \frac{1}{W} \sum_{i=1}^{N} w_i \cdot L_{j,i},$$

$w_i$ is a weight assigned to model $M_i$ and $W=\Sigma_{i=1}^{N} w_i$. Various voting strategies are possible, for example, all micro-models can be weighted identically or each micro-model can have an assigned weight, $w_i$, based on, for example, the number of data items used to train it and/or the type of data items in each micro-model.

In some cases, micro-models 135 may contain attack-related content. If an abnormal data item related to attack-related content is classified using such a micro-model, or a model including such a micro-model, the abnormal data item may be classified as normal despite being abnormal. In some embodiments, such attack-related content can be removed from the micro-model 135. For example, data items can be removed from the training dataset based on their score. In some embodiments, a set of normal data items, $T_{san}$ 150 and a set of abnormal data items $T_{abn}$, can be created and used to generate a sanitized model $M_{san}$ and an abnormal model $M_{abn}$, using for example, the following equations:

$$T_{san}=\cup\{P_j|\text{SCORE}(P_j)\leq V\}, M_{san}=AD(T_{san}); \text{ and}$$

$$T_{abn}=\cup\{P_j|\text{SCORE}(P_j)>V\}, M_{abn}=AD(T_{san})$$

where V is a voting threshold. In embodiments where voting is unweighted, V can be the maximum percentage of abnormal labels permitted such that a data item is labeled normal. V can be set to various values between 0 and 1, for example, V may be set to a value between 0.15 and 0.45. Sanitized data items 150 can be used, for example, to generate, at 160, a sanitized anomaly detection model 170. A user and/or system administrator can set V based on, for example, the training set or sets being used, the type of anomaly detection model being used, the granularity, and/or the type of data monitored. V can be chosen to achieve an appropriate balance between detection and false positive rates. For example, V may be chosen to achieve a high detection rate and a low false positive rate. The selection of a value for V can also depend on various values selected in the particular anomaly detection system being used, for example, to generate each micro-model at model 135 and/or to generate a model at 160 and/or 190. For example, some anomaly detection systems have a threshold value which can be set to provide a dividing line between normal behavior and abnormal behavior. In selecting a value for V, a threshold value can be considered and in selecting a threshold value, the value of V can be considered.

Figure 2:
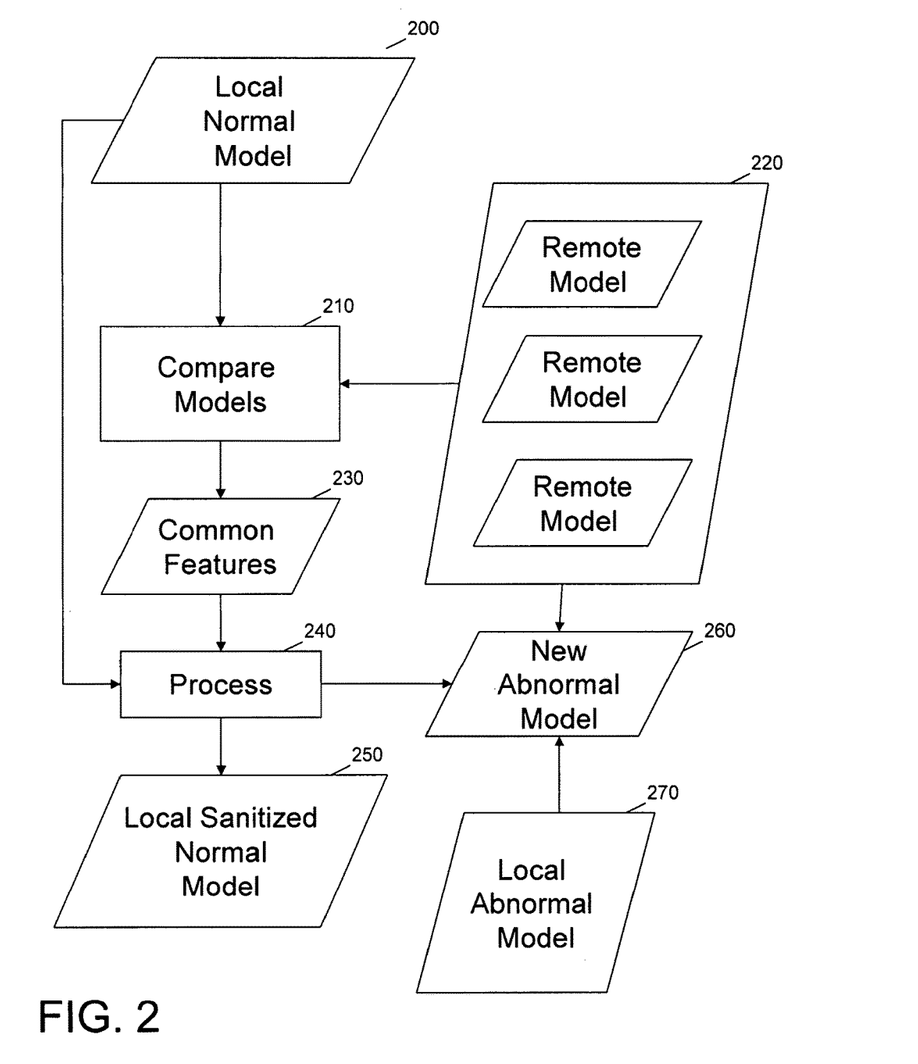
FIG. 2 is a simple illustration of a method for sanitizing a local anomaly detection model using remote anomaly detection models in accordance with some embodiments of the disclosed subject matter.

In some embodiments, systems, methods, and media for sanitizing anomaly detection models by collaborating with various digital processing devices are provided. Various digital processing devices can share various abnormal, normal, and/or sanitized models and compare models to update at least one a local abnormal, normal, and/or sanitized model. In various embodiments, normal models, abnormal models, and/or sanitized models can be separate models (e.g., stored as separate data structures). In various embodiments, normal models, abnormal models, and/or sanitized models can be stored together as one model (e.g., with various portions identified as abnormal or normal). For example, FIG. 2 illustrates a method for sanitizing a local normal anomaly detection model 200 based on remote abnormal anomaly detection models 220 to generate a local sanitized normal anomaly detection model 250. In some embodiments, anomaly detection model 200 can include, for example, anomaly detection model 170 and/or models 220 can include model 195. Model 200 can be compared, at 210, to one or more of models 220 to produce a common set of features 230 common to both model 200 and at least one of models 220. Model 200 can be processed, at 240, to generate a sanitized model 250, that, for example, does not contain content contained in both model 200 and any of models 220. In some embodiments, model 250 can be represented in equation form as: Model 250=Model 200−∪{Models 220∩Model200}. In some embodiments, a new and/or updated abnormal model 260 can be generated. This model can include, for example, a model of abnormal behavior including models 220 and/or common features 230. Model 250 can also be combined with, for example, a local model of abnormal behavior, such as model 270.

Figure 3:
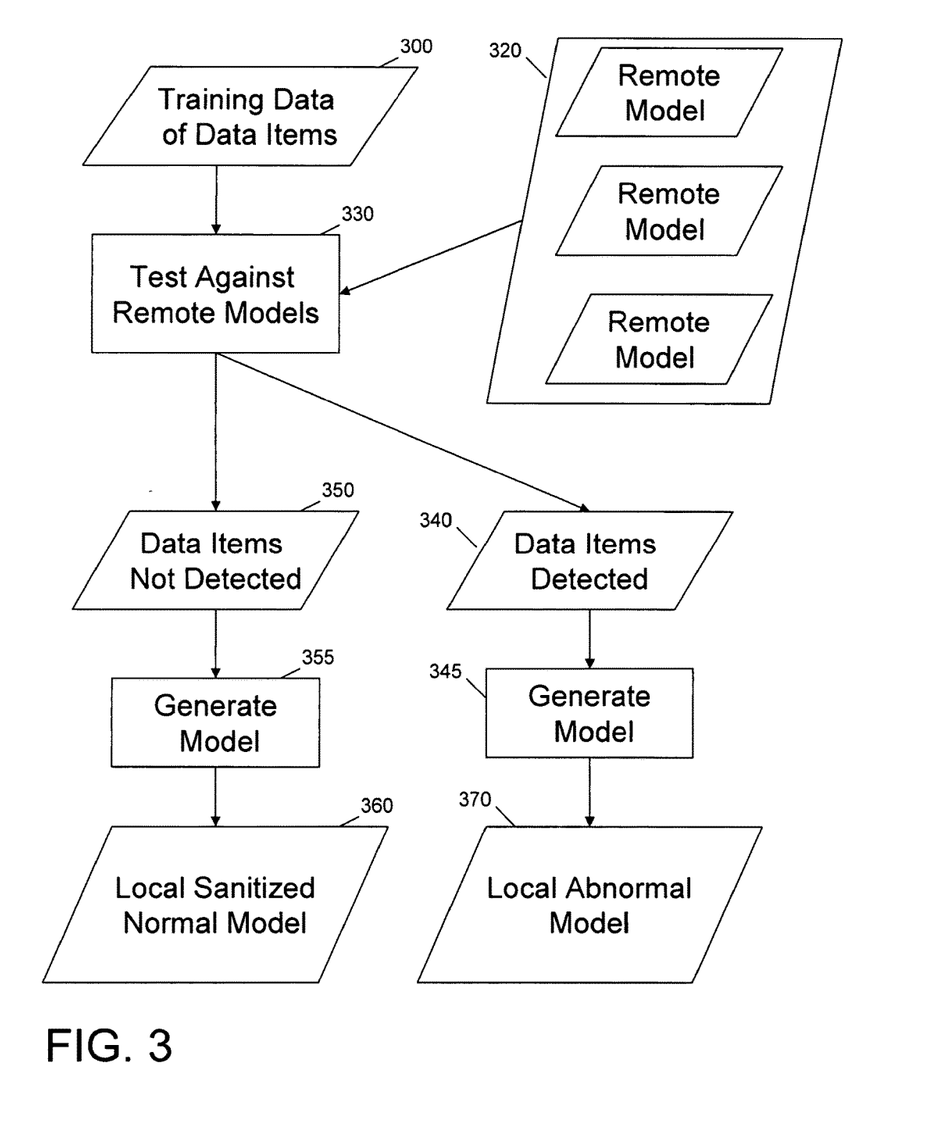
FIG. 3 is a simple illustration of a method for sanitizing a local training data set using remote anomaly detection models and generating at least one of a sanitized anomaly detection model and an abnormal anomaly detection model in accordance with some embodiments of the disclosed subject matter.

In some embodiments, a local model 200 and remote models 220 may not be directly comparable. For example, model 200 may have been generated using a first anomaly detection model generating method and some of models 220 may have been generated using a second anomaly detection model generating method which generates a different type of model than the first method. In some embodiments, a local training data set can be tested against various remote models. Based on this testing, a new local model or models can be generated. The local training data set as well as the remote models can be various combinations of normal models and abnormal models. For example, FIG. 3 illustrates a method for sanitizing a local normal training data set 300 based on remote abnormal detection models 320 to generate a local normal sanitized anomaly detection model 360 and a local abnormal anomaly detection model 370. Data set 300 can be tested, at 330, against remote models 320. If a remote model of the models 320 indicates a hit on a data item (in this case, if a model 320 indicates a data item is anomalous), it can be added to anomalous data set 340. If a remote model of the models 320 does not indicate a hit on a data item (in this case, if a model 320 indicates a data item is normal), it can be added to normal data set 350. Models 360 and 370 can be generated, at 355 and 345, based on their corresponding dataset of datasets 350 or 340.

Figure 4:
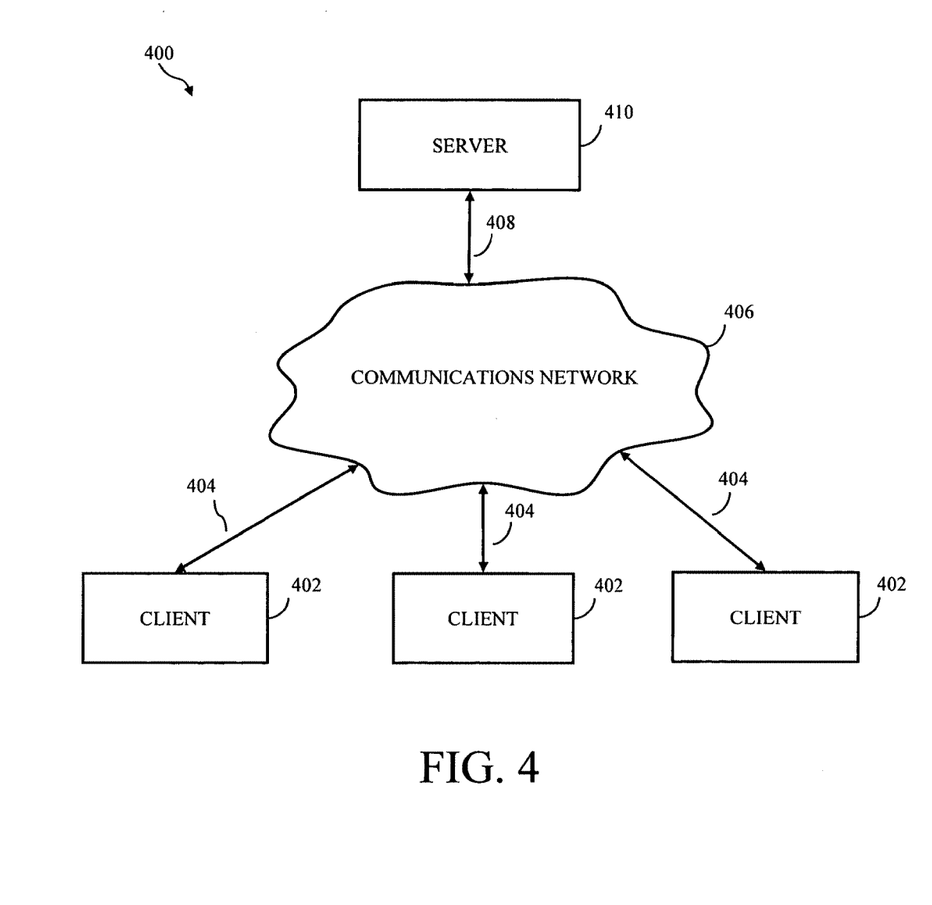
FIG. 4 is a schematic diagram of a system suitable for sanitizing, generating, and/or sharing data sets and/or anomaly detection models in accordance with some embodiments of the disclosed subject matter.

FIG. 4 is a schematic diagram of an illustrative system 400 that can be used for generating sanitized data, sanitizing anomaly detection models, and/or generating anomaly detection models in accordance with some embodiments of the disclosed subject matter. As illustrated, system 400 can include one or more clients 402. Clients 402 can be connected by one or more communications links 404 to a communications network 406 or connected directly to each other. Communications network 406 can also be linked through a communications link 408 to a server 410. Various embodiments of the disclosed subject matter can be implemented on at least one of the server and the clients. It is also possible that a client and a server can be connected through communication links 408 or 404 directly and not through a communication network 406.

In system 400, server 410 can be any suitable server or digital processing device for executing an application, such as, for example, a processor, a computer, a data processing device, or a combination of such devices. Communications network 406 can be various networks including the Internet, an intranet, a wide-area network (WAN), a local-area network (LAN), a wireless network, a frame relay network, an asynchronous transfer mode (ATM) network, a virtual private network (VPN), a mobile ad-hoc network (MANET), etc. or any combination of any of the same. Communications links 404 and 408 can be any communications links suitable for communicating data between clients 402 and server 410, such as network links, dial-up links, wireless links, hardwired links, etc. Clients 402 can be any suitable digital processing devices, such as, for example, personal computers, laptop computers, mainframe computers, data displays, Internet browsers, personal digital assistants (PDAs), two-way pagers, wireless terminals, portable telephones, etc., or any combination of the same. In some embodiments, clients 402 and server 410 can be located within an organization. Alternatively, clients 402 and server 410 can be distributed between multiple organizations.

Figure 5:
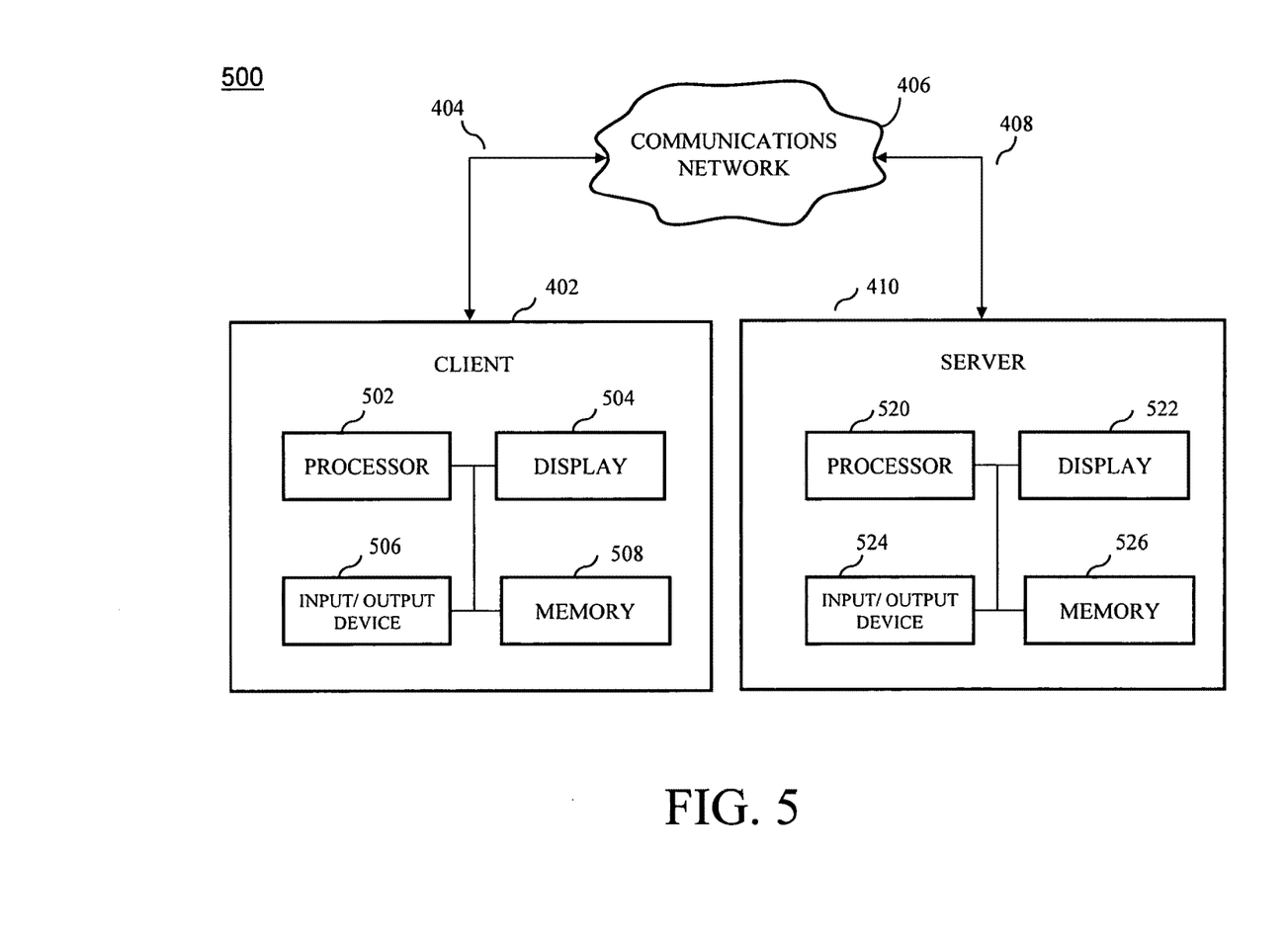
FIG. 5 is an illustration of nodes that can be used in FIG. 1 in accordance with some embodiments of the disclosed subject matter.

The server 410 and one of the clients 402, which are depicted in FIG. 4, are illustrated in more detail in FIG. 5. Referring to FIG. 5, client 402 and server 410 can include respectively, among other things, processors 502 and 520, displays 504 and 522, input/output devices 506 and 524, and memory 508 and 526, which can be interconnected. The input/output devices can receive input and send output such as, for example, text from keyboard, images from a camera, images from a scanner, audio recordings, voice-to-text translations, network traffic, packets, anomaly detection models, and/or training datasets, etc. In some embodiments, memory 508 and 526 contain a storage device for storing a program for controlling processors 502 and 520 and/or performing methods such as those illustrated in FIGS. 1-3. Variations and combinations of system 500 might be suitable for different embodiments of the disclosed subject matter. In addition, although some embodiments are described herein as being implemented on a client and/or a server, this is only illustrative. Various components of some embodiments of the disclosed subject matter can be implemented on any suitable platform.

Figure 6:
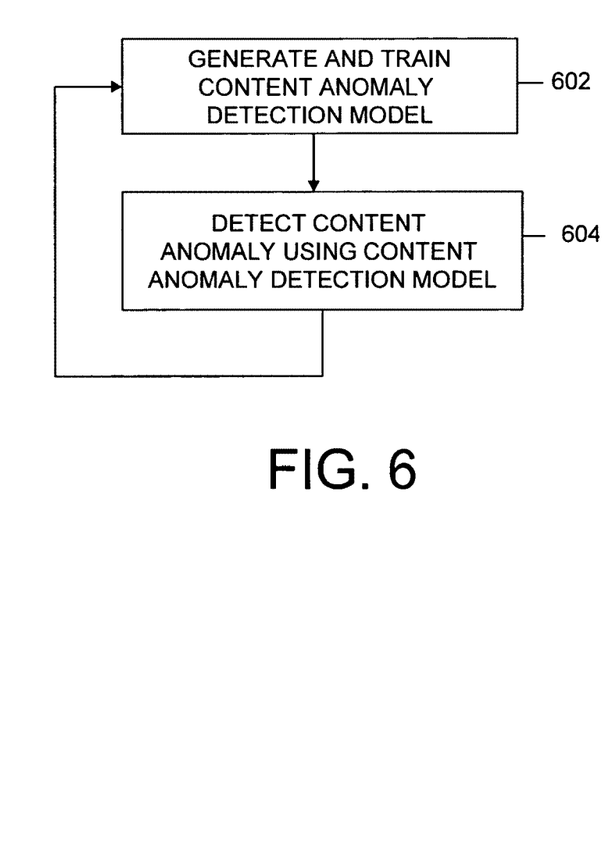
FIG. 6 is a simplified illustration of a method for generating a content anomaly detection model and detecting content anomalies in accordance with some embodiments of the disclosed subject matter.

The systems, methods, and media of the disclosed subject matter can be used in accordance with various anomaly detection systems and methods. For example, FIG. 6 is a simplified illustration of a method for generating an anomaly detection model and detecting content anomalies. As shown, at 602, a content anomaly detection model can be generated and trained. At 304, the content anomaly detection model can be used to detect anomalies. Various embodiments of the method of FIG. 6 are described in, for example International Application No. PCT/US2007/005408, which is hereby incorporated by reference herein in its entirety.

Figure 7:
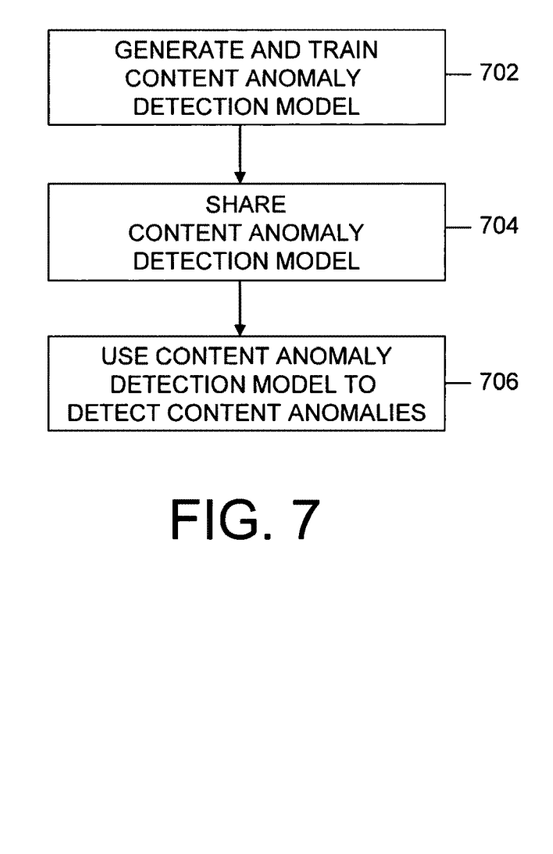
FIG. 7 is a simplified illustration of a method for generating, training, and sharing a binary-based content anomaly detection model and for using the content anomaly model to detect content anomalies in accordance with some embodiments of the disclosed subject matter.

Also, for example, FIG. 7 is a simplified illustration of methods for generating, training, and sharing a binary-based content anomaly model and for using the content anomaly model to detect content anomalies. As shown, at 702, a binary-based content anomaly detection model is generated and trained. At 704, the binary-based content anomaly detection is shared. A shared model can be received from one or more remote sites to compare with and update a local model. At 706, the binary based content anomaly detection model is used to detect content anomalies. For example, an anomaly score of an input dataset can be used to determine whether the input dataset is anomalous. Various embodiments of the method of FIG. 7 are described in, for example International Application No. PCT/US2007/005406, which is hereby incorporated by reference herein in its entirety. Other examples of systems and methods that can be used to detect anomalies and/or generate anomaly detection models, are described in, for example, International Application No. PCT/US2004/037654, International Application No. PCT/US2007/83003, and U.S. patent application Ser. No. 10/986, 447, each of which is hereby incorporated by reference herein in its entirety.

In some embodiments, if a remote model indicates that a local training data item is abnormal and/or a local normal model contains abnormal content, further testing can be performed. For example, returning to FIGS. 1-3, in some embodiments, if a data item, series of data items, and/or or portion of a model is found to be abnormal at, for example, 140, 210 and/or 330, further evaluation can be performed. The further evaluation can include, for example, execution and/or processing of data items executed in a protected environment that can monitor and detect for abnormal behavior. If the execution in the protected environment determines that the data item or items are not abnormal, or are otherwise acceptable, then the indication of anomaly from remote models can be ignored. For example, instead of adding a data item determined to be abnormal, at 300, to abnormal data items 340, the data item, and possibly related data items (e.g., an entire function or other section of code associated with the data item), can be sent for additional testing in a protected environment. If this processing determines the data item is normal, it can be added to normal data items 350. Various systems and/or methods can be used to perform this additional testing, for example, the systems and/or methods of U.S. patent application Ser. No. 11/870, 043, International Application No PCT/US2007/83003, and/or International Application No PCT/US2007/78773, each of which is hereby incorporated by reference herein in its entirety.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for generating sanitized data, the method comprising:
    receiving, using a hardware processor, a plurality of data items;
    generating a plurality of data subsets from the plurality of data items, wherein each of the plurality of data subsets includes at least one data item of the plurality of data items;
    generating a plurality of anomaly detection models, wherein each of the plurality of anomaly detection models is generated based on one or more of the plurality of data subsets;
    determining whether to remove at least one data item from the plurality of data items in response to applying the at least one data item to each of the plurality of anomaly detection models;
    generating a dataset that includes at least a portion of the plurality of data items based on the determination, wherein the dataset includes a set of normal data items; and
    generating a normal anomaly detection model based on the set of normal data items included in the dataset.

2. The method of claim 1, wherein the plurality of anomaly detection models includes one anomaly detection model for each data subset of the plurality of data subsets.

3. The method of claim 1, wherein the determination further comprises determining a score for the at least one data item by testing the at least one data item against each of the plurality of anomaly detection models.

4. The method of claim 1, wherein the determination further comprises:

determining a label for the at least one data item from each of the plurality of anomaly detection models, wherein the label indicates that the at least one data item is normal or abnormal; and assigning an updated label to the at least one data item that indicates the at least one data item is abnormal based on the sum of the labels in comparison with a threshold value.

5. The method of claim 4, further comprising testing a second dataset using the anomaly detection model to determine whether the second dataset contains attack data.

6. The method of claim 1, wherein the determination further comprises:

determining a label for the at least one data item from each of the plurality of anomaly detection models, wherein the label indicates that the at least one data item is normal or abnormal;

adjusting the label from each of the plurality of anomaly detection models based on a weight assigned to each anomaly detection model; and assigning an updated label to the at least one data item that indicates the at least one data item is abnormal based on the weighted sum of the adjusted labels in comparison with a threshold value.

7. The method of claim 6, wherein at least two anomaly detection models of the plurality of anomaly detection models are assigned different weights.

8. The method of claim 6, wherein at least two anomaly detection models of the plurality of anomaly detection models are assigned the same weight.

9. The method of claim 6, wherein the assigned weight is based on the number of data items in the one or more data subsets used to generate an anomaly detection model.

10. The method of claim 1, wherein the generating further comprises removing the at least one data item from the plurality of data items in response to the determination.

11. The method of claim 1, further comprising generating an anomaly detection model based on the generated dataset.

12. The method of claim 1, wherein the dataset includes a set of abnormal data items and wherein the method further comprises:

generating an abnormal anomaly detection model based on the set of abnormal data items included in the dataset; and generating a local abnormal anomaly detection model based on the normal anomaly detection model and the abnormal anomaly detection model.

13. The method of claim 12, wherein at least one of the normal anomaly detection model, the abnormal anomaly detection model, and the local abnormal anomaly detection model is shared with a remote computing device.

14. A system for generating sanitized data, the system comprising:

a hardware processor that is configured to:
receive a plurality of data items;
generate a plurality of data subsets from the plurality of data items, wherein each of the plurality of data subsets includes at least one data item of the plurality of data items;
generate a plurality of anomaly detection models, wherein each of the plurality of anomaly detection models is generated based on one or more of the plurality of data subsets;
determine whether to remove at least one data item from the plurality of data items in response to applying the at least one data item to each of the plurality of anomaly detection models;
generate a dataset that includes at least a portion of the plurality of data items based on the determination, wherein the dataset includes a set of normal data items; and
generate a normal anomaly detection model based on the set of normal data items included in the dataset.

15. A non-transitory computer-readable medium containing computer-executable instructions that, when executed by a processor, cause the processor to perform a method for generating sanitized data, the method comprising:

receiving a plurality of data items;
generating a plurality of data subsets from the plurality of data items, wherein each of the plurality of data subsets includes at least one data item of the plurality of data items;
generating a plurality of anomaly detection models, wherein each of the plurality of anomaly detection models is generated based on one or more of the plurality of data subsets;
determining whether to remove at least one data item from the plurality of data items in response to applying the at least one data item to each of the plurality of anomaly detection models;
generating a dataset that includes at least a portion of the plurality of data items based on the determination, wherein the dataset includes a set of normal data items; and
generating a normal anomaly detection model based on the set of normal data items included in the dataset.

16. A method for generating sanitized data, the method comprising:

receiving, using a hardware processor, a plurality of data items;
generating a plurality of data subsets from the plurality of data items, wherein each of the plurality of data subsets includes at least one data item of the plurality of data items;
generating a plurality of anomaly detection models, wherein each of the plurality of anomaly detection models is generated based on one or more of the plurality of data subsets;
determining whether to remove at least one data item from the plurality of data items in response to applying the at least one data item to each of the plurality of anomaly detection models;
generating a dataset that includes at least a portion of the plurality of data items based on the determination, wherein the dataset includes a set of abnormal data items; and
generating an abnormal anomaly detection model based on the set of abnormal data items included in the dataset.

17. A system for generating sanitized data, the system comprising:

a hardware processor that is configured to:
receive a plurality of data items;
generate a plurality of data subsets from the plurality of data items, wherein each of the plurality of data subsets includes at least one data item of the plurality of data items;
generate a plurality of anomaly detection models, wherein each of the plurality of anomaly detection models is generated based on one or more of the plurality of data subsets;
determine whether to remove at least one data item from the plurality of data items in response to applying the at least one data item to each of the plurality of anomaly detection models;

generate a dataset that includes at least a portion of the plurality of data items based on the determination, wherein the dataset includes a set of abnormal data items; and generating an abnormal anomaly detection model based on the set of abnormal data items included in the dataset.

18. A non-transitory computer-readable medium containing computer-executable instructions that, when executed by a processor, cause the processor to perform a method for generating sanitized data, the method comprising:

receiving a plurality of data items;

generating a plurality of data subsets from the plurality of data items, wherein each of the plurality of data subsets includes at least one data item of the plurality of data items;

generating a plurality of anomaly detection models, wherein each of the plurality of anomaly detection models is generated based on one or more of the plurality of data subsets;

determining whether to remove at least one data item from the plurality of data items in response to applying the at least one data item to each of the plurality of anomaly detection models;

generating a dataset that includes at least a portion of the plurality of data items based on the determination, wherein the dataset includes a set of abnormal data items; and generating an abnormal anomaly detection model based on the set of abnormal data items included in the dataset.

* * * * *